Sept. 15, 1925.
S. ORIOKA
WHEEL FENDER
Filed Jan. 22, 1925.
1,553,464
2 Sheets-Sheet 1
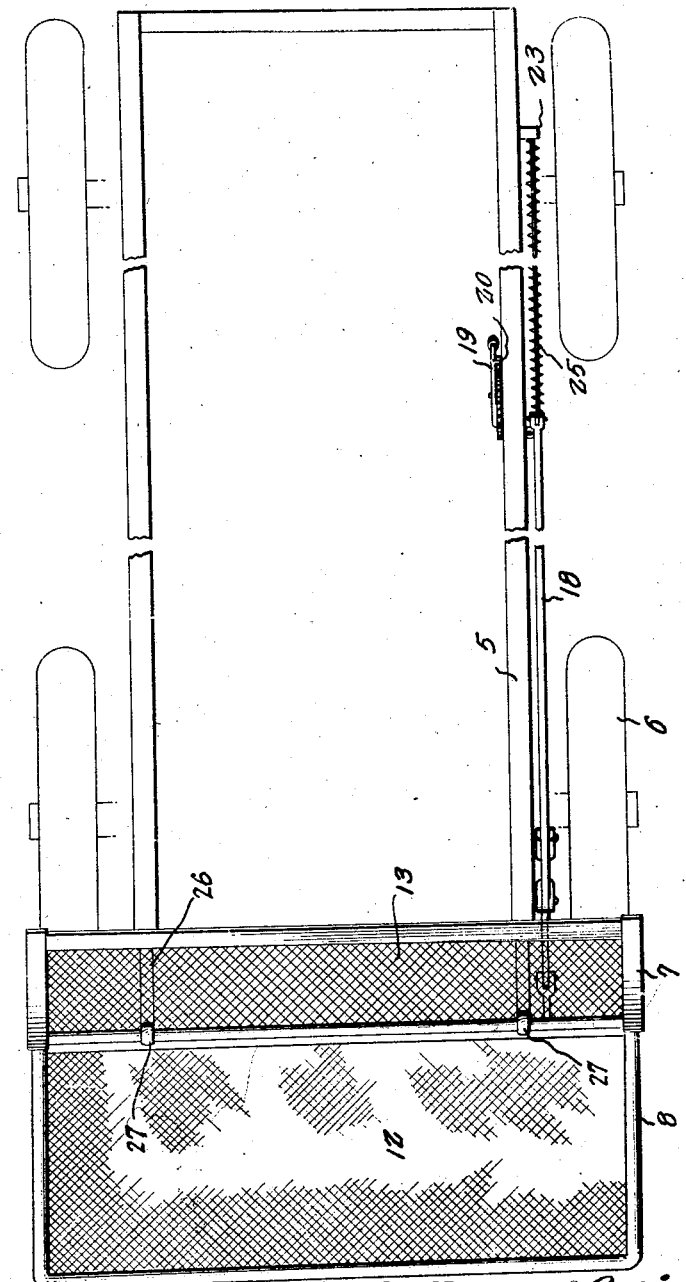

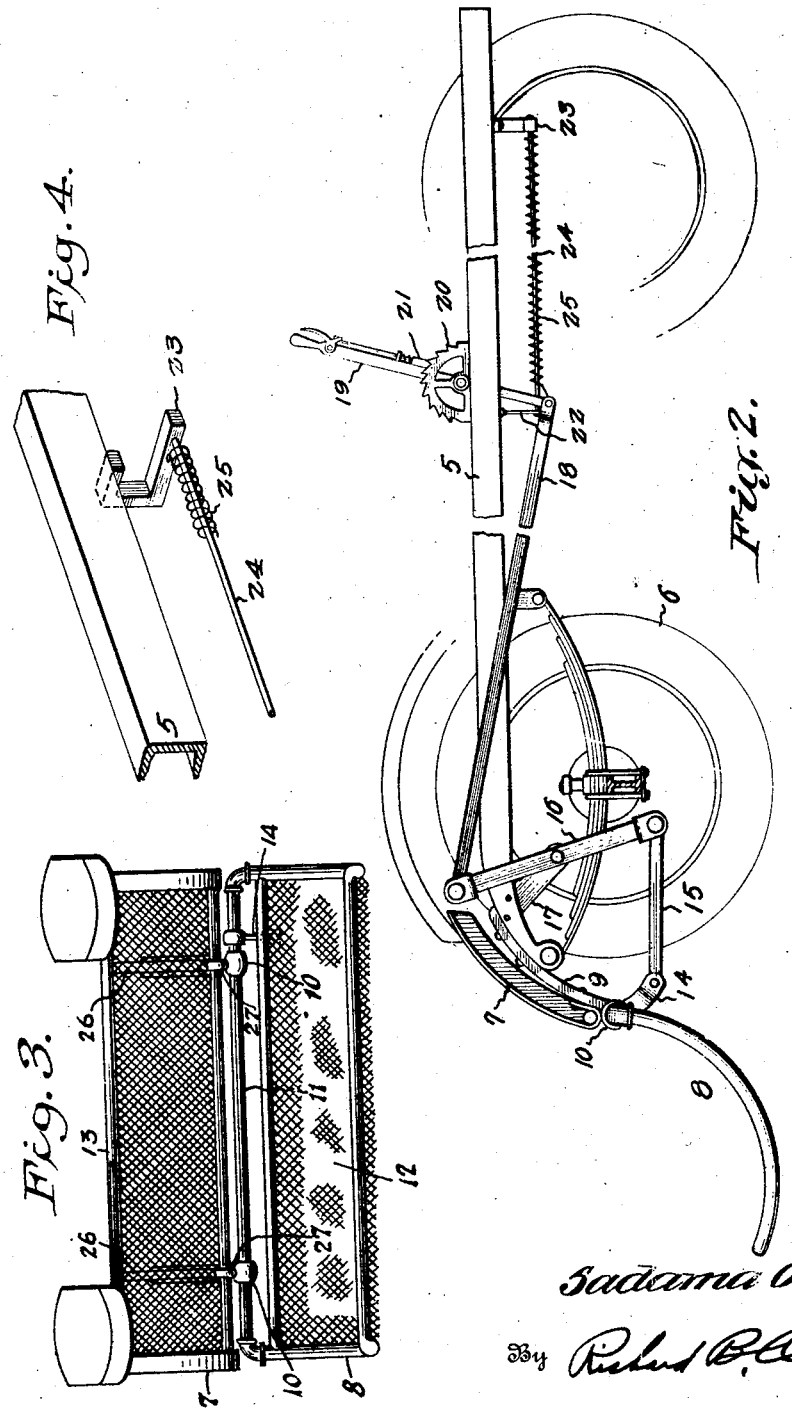

Patented Sept. 15, 1925.

1,553,464

UNITED STATES PATENT OFFICE.

SADAMA ORIOKA, OF HONOLULU, TERRITORY OF HAWAII.

WHEEL FENDER.

Application filed January 22, 1925. Serial No. 4,097.

*To all whom it may concern:*

Be it known that I, SADAMA ORIOKA, a citizen of the United States, residing at Honolulu, Territory of Hawaii, have invented certain new and useful Improvements in Wheel Fenders, of which the following is a specification.

This invention relates to wheel fenders for automobiles, and has particular reference to fenders of that type adapted to support a person so as to prevent injury to him or her by the front wheel of the vehicle.

More particularly, the invention relates to that class of wheel fenders which embodies a rigidly mounted upper or back section and a lower scoop section pivotally mounted for vertical swinging movement, whereby said scoop section may be raised to an inoperative position, means being provided to lower the scoop section in an emergency or when required for use, such means being under the convenient control of the operator of the vehicle.

The primary object of the present invention is to generally simplify and improve wheel fenders of the above kind whereby the same may meet with all of the requirements for a successful commercial use.

With the above general objects in view and others that will become apparent as the nature of the invention is better understood the same consists in the novel form, combination and arrangement of parts hereinafter more fully described, shown in the accompanying drawings and claimed.

In the drawings wherein like reference characters indicate corresponding parts throughout the several views, Figure 1 is a top plan view of a wheel fender constructed in accordance with the present invention, shown operatively applied upon the front end of an automobile chassis, Figure 2 is a side elevational view of the device shown in Figure 1, Figure 3 is a front elevational view thereof, and Figure 4 is an enlarged fragmentary perspective view illustrating details of the invention.

Referring more in detail to the drawings, 5 indicates the side rails of the chassis frame of a motor vehicle, and 6 indicates the front wheels of said vehicle. The present invention embodies the provision of a cradle extending across the front of the vehicle, and this cradle includes an upper or back section 7 and a lower scoop section 8. Rigidly secured upon the forward ends of the chassis rails 5 are brackets 9 that project forwardly and downwardly and terminate in transverse bearings or sleeves 10 in which the upper or rear frame bar 11 of the scope 8 is journaled whereby the scoop section 8 is mounted for vertical swinging movement. The scoop section 8 preferably consists in a curved or arcuate rectangular frame having a body portion in the form of wire mesh or the like as indicated at 12. The ends of the rigid back section 7 are securely fastened to the brackets 9 in any desired or preferred manner, and this upper or back section 7 further includes a frame having a body portion of wire mesh or the like as indicated at 13.

Suitably fixed upon one end portion of the upper or rear frame bar 11 of the scoop 8 is an arm 14 that projects downwardly and rearwardly and has its lower end pivotally connected to the forward end of a link 15 whose rear end is pivoted to the lower end of a lever 16. The lever 16 is mounted for swinging movement in a vertical plane by being pivoted intermediate its ends to a bracket 17 suitably secured to the adjacent chassis rail 5, and the upper end of the lever 16 is connected by means of a relatively long rod or link 18 to the lower end of a hand lever 19 that is journaled for swinging movement in a vertical plane and positioned so as to be within convenient reach of the operator of the vehicle. Associated with the lever 19 is a ratchet segment 20, the teeth of which are adapted to cooperate with a spring pressed latch 21 carried by the lever 19 for preventing rearward swinging movement of the upper end of said lever 19 and consequently holding the scoop 8 in an elevated or upwardly swung inoperative position. It will however be noted by releasing the latch 21 the lever 19 may be readily swung rearwardly for causing the scoop section 8 to lower when it is desired to prevent a person from becoming crushed beneath the wheels 6. Rigidly carried by the chassis rail 5 adjacent to the lever 19 is a depending bracket 22, and rigidly secured to this same rail rearwardly of the lever 19 is another bracket 23, said brackets 22 and 23 supporting the ends of a rod 24 which is encircled by a coiled or helical compression spring. The rod 24 serves as a support and guide for the spring 25, and this spring has its ends attached to and in abutting relation to the bracket 23 and the lower end of the lever 19 as clearly shown in Figure 2. When the vehicle is travelling, vibration often tends to cause violent upward movement of the scoop 8 and consequent forward swinging of the upper end of the lever 19 to an undue extent, and such vibration is cushioned, and the incident shock absorbed by the spring 25. Reinforcing strips 26 are provided on the under side of the body portion 13 of the back section 7, and the lower ends of the strips 26 are preferably formed to embrace the lower rod of the frame of the section 7 as at 27.

In operation, the scoop section 8 is normally held elevated clear of the ground by swinging the lever 19 forwardly where it is held by the latch 21 engaging a tooth of the segment 20. Should the driver of the vehicle see a danger of running over a person by reason of the fact that he cannot bring the vehicle to a stop or stand still within a sufficient time, the latch 21 will be released and the lever 19 swung rearwardly so as to cause the scoop 8 to lower into close proximity to the ground. The person will then be caught by the scoop 8 and carried along so as to prevent the wheels 6 from running over him.

The provision of the upper or back section 7 prevents the person from passing over the upper edge of the scoop section in the usual manner.

From the foregoing description it is believed that the construction and operation as well as the advantages of the present invention will be readily understood and appreciated by those skilled in the art.

What I claim as new is:—

1. In a wheel fender, a pair of brackets adapted to be rigidly secured to the forward ends of the chassis rails of a motor vehicle so as to assume a forward and downwardly extending position, the forward lower ends of the brackets being provided with horizontal transversely disposed bearing sleeves, an upper cradle section secured across the front of the vehicle upon said brackets, a lower curved scoop section having a frame provided with a rear frame bar journaled in the bearing sleeves of the brackets whereby the scoop is mounted for vertical swinging movement, and manually operable means for raising the scoop section and holding the same elevated, said last named means being manually releasable for lowering of the scoop section, said last named means further embodying a hand lever mounted for vertical swinging movement, a lever pivoted for vertical swinging movement at a point intermediate its ends, a link connecting the upper end of the hand lever with the second named lever, an arm projecting downwardly and rearwardly from the rear frame bar of the scoop section, a link connecting the lower end of said arm with the lower end of the second named lever, and a ratchet segment associated with the hand lever, said hand lever embodying a manually releasable spring pressed latch cooperating with the teeth of the ratchet segment for holding the scoop section elevated.

2. In a wheel fender, a pair of brackets adapted to be rigidly secured to the forward ends of the chassis rails of a motor vehicle so as to assume a forward and downwardly extending position, the forward lower ends of the brackets being provided with horizontal transversely disposed bearing sleeves, an upper cradle section secured across the front of the vehicle upon said brackets, a lower curved scoop section having a frame provided with a rear frame bar journaled in the bearing sleeves of the brackets whereby the scoop is mounted for vertical swinging movement, and manually operable means for raising the scoop section and holding the same elevated, said last named means being manually releasable for lowering of the scoop section, said last named means further embodying a hand lever mounted for vertical swinging movement, a lever pivoted for vertical swinging movement at a point intermediate its ends, a link connecting the lower end of the hand lever with the second named lever, an arm projecting downwardly and rearwardly from the rear frame bar of the scoop section, a link connecting the lower end of said arm with the lower end of the second named lever, and a ratchet segment associated with the hand lever, said hand lever embodying a manually releasable spring pressed latch cooperating with the teeth of the ratchet segment for holding the scoop section elevated, and yieldable means associated with the lower end of the hand lever for absorbing shock due to undue upward movement of the scoop section upon passing of the vehicle over an inequality of the road.

3. A wheel fender including a scoop section, means for pivotally mounting the scoop section at the forward end of a motor vehicle for vertical swinging movement, levers and links operatively associated with the scoop, a hand lever associated with the levers and links for raising and lowering the scoop, means associated with the hand lever for retaining the same in position with the scoop elevated, releasable means carried by the lever for permitting lowering of the scoop, and yieldable means associated with the hand lever for absorbing shock due to undue upward vibration of the scoop.

In testimony whereof I affix my signature.

SADAMA ORIOKA.